United States Patent [19]

Norman, Jr. et al.

[11] Patent Number: 5,671,855
[45] Date of Patent: Sep. 30, 1997

[54] HIGH STRENGTH INDUSTRIAL STORAGE TANK

[75] Inventors: Eddy Norman, Jr., Springer; Billy Steve Brown, Sulfur, both of Okla.

[73] Assignee: Spade Leasing, Inc., Springer, Okla.

[21] Appl. No.: 603,644

[22] Filed: Feb. 20, 1996

[51] Int. Cl.⁶ ................................................. B65D 90/02
[52] U.S. Cl. .......................... 220/1.5; 220/671; 296/188
[58] Field of Search .......................... 220/1.5, 671, 562, 220/670, 673, 674; 296/181, 182, 187, 188; 414/498, 500; 294/68.1, 68.26

[56] References Cited

U.S. PATENT DOCUMENTS

| | | | |
|---|---|---|---|
| D. 253,051 | 10/1979 | Pletcher | D12/95 |
| D. 301,326 | 5/1989 | Adams | D12/95 |
| D. 318,033 | 7/1991 | Pelt | D12/95 |
| D. 348,304 | 6/1994 | Norman, Jr. et al. | D23/202 |
| D. 353,352 | 12/1994 | Holloway, Jr. | D12/95 |
| 2,005,641 | 6/1935 | Stanitz et al. | 220/671 |
| 3,964,625 | 6/1976 | Wirz | 214/502 |
| 4,138,163 | 2/1979 | Calvert et al. | 220/1.5 |
| 4,318,549 | 3/1982 | Pletcher | 280/5 C |
| 4,380,300 | 4/1983 | Mountz et al. | 220/1.5 |
| 4,589,565 | 5/1986 | Spivey | 220/71 |
| 4,795,049 | 1/1989 | Alcorn | 220/1.5 |
| 4,911,318 | 3/1990 | Bishop | 220/1.5 |
| 5,004,269 | 4/1991 | Pelt | 280/837 |
| 5,058,924 | 10/1991 | Whatley, Jr. | 280/837 |
| 5,213,367 | 5/1993 | Norman, Jr. et al. | 280/837 |
| 5,273,180 | 12/1993 | Whatley, Jr. | 220/565 |
| 5,284,266 | 2/1994 | Janvel et al. | 220/1.5 |
| 5,385,263 | 1/1995 | Kirk et al. | 220/589 |
| 5,535,907 | 7/1996 | Elvin-Jensen | 220/1.5 |

OTHER PUBLICATIONS

Galbreath Incorporated advertising brochure entitled "Roll-Off Sludge Containers" (1994).
Stellar Industries, Inc. advertising brochure entitled "26 Ton Hydraulic Hook Lift" (Apr., 1994).
Publication entitled "The Hauler", vol. 18, No. 8 (Dec. 1994).
*The Quarter Horse Journal*, WC304 (Nov. 1994) (an advertisement of 4-Star Trailer, Inc. entitled "Seeing is Believing").

Primary Examiner—Stephen J. Castellano
Attorney, Agent, or Firm—Dougherty, Hessin, Beavers & Gilbert

[57] ABSTRACT

A high strength industrial storage tank is provided. The tank includes a pair of opposed sidewalls, a pair of opposed end walls, each end wall interconnecting the sidewalls, and a floor connected to the sidewalls and the end walls. Each of the sidewalls and end walls includes a series of alternating vertically extending outer members and vertically extending grooves. Each groove extends toward the interior of the tank and includes a bottom and two sides. Each groove further includes an inner arcuate portion that is arched toward the interior of the tank and has a substantially constant radius of from about 3.0 to about 4.5 inches. The structure of the sidewalls makes it relatively easy to clean the tank and apply and maintain paint and other protective coatings on the surfaces of the tank. The tank can optionally include structure that makes it suitable for storing liquids and other fluids and/or structure that makes it compatible with roll-off transport trucks.

6 Claims, 6 Drawing Sheets

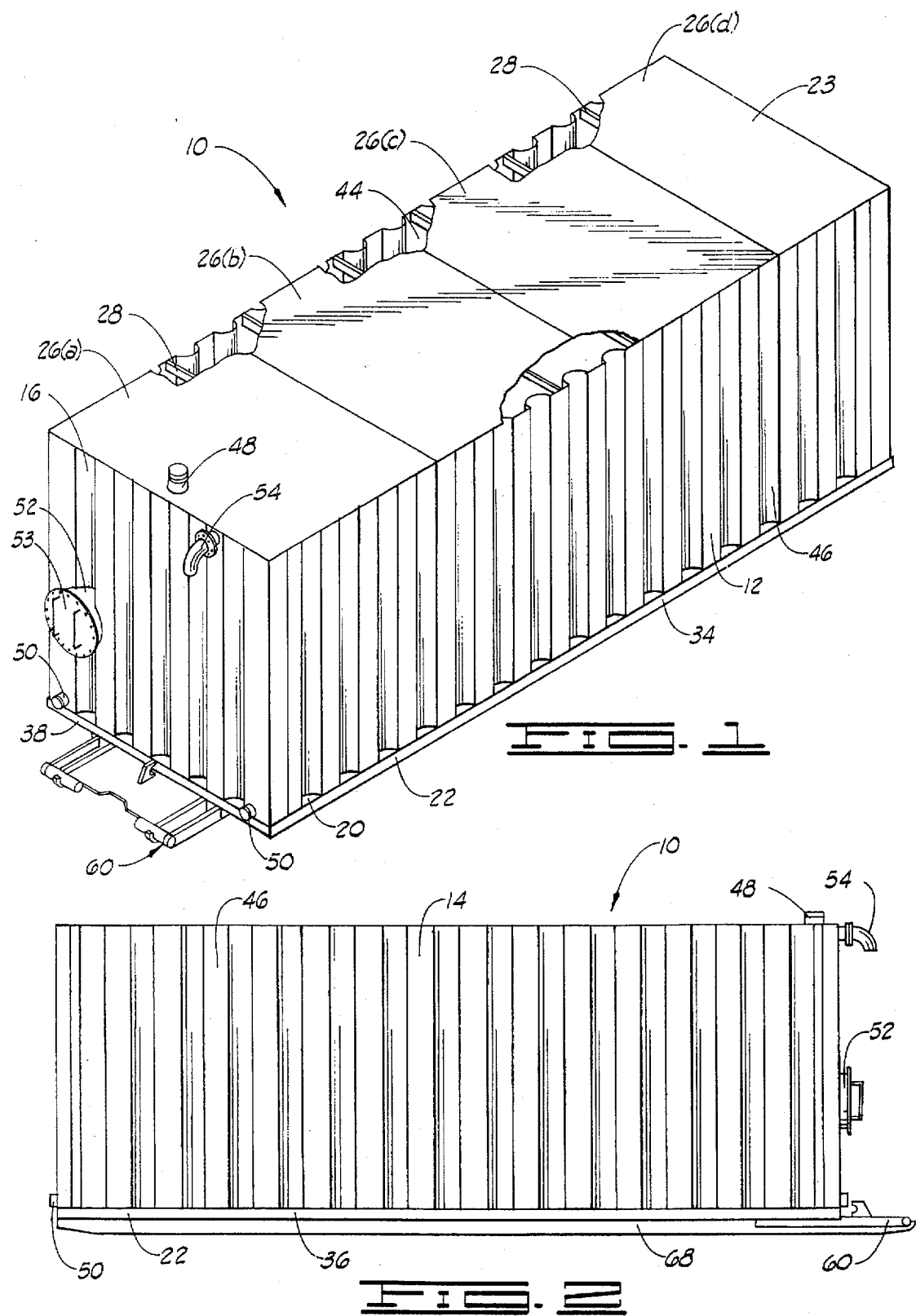

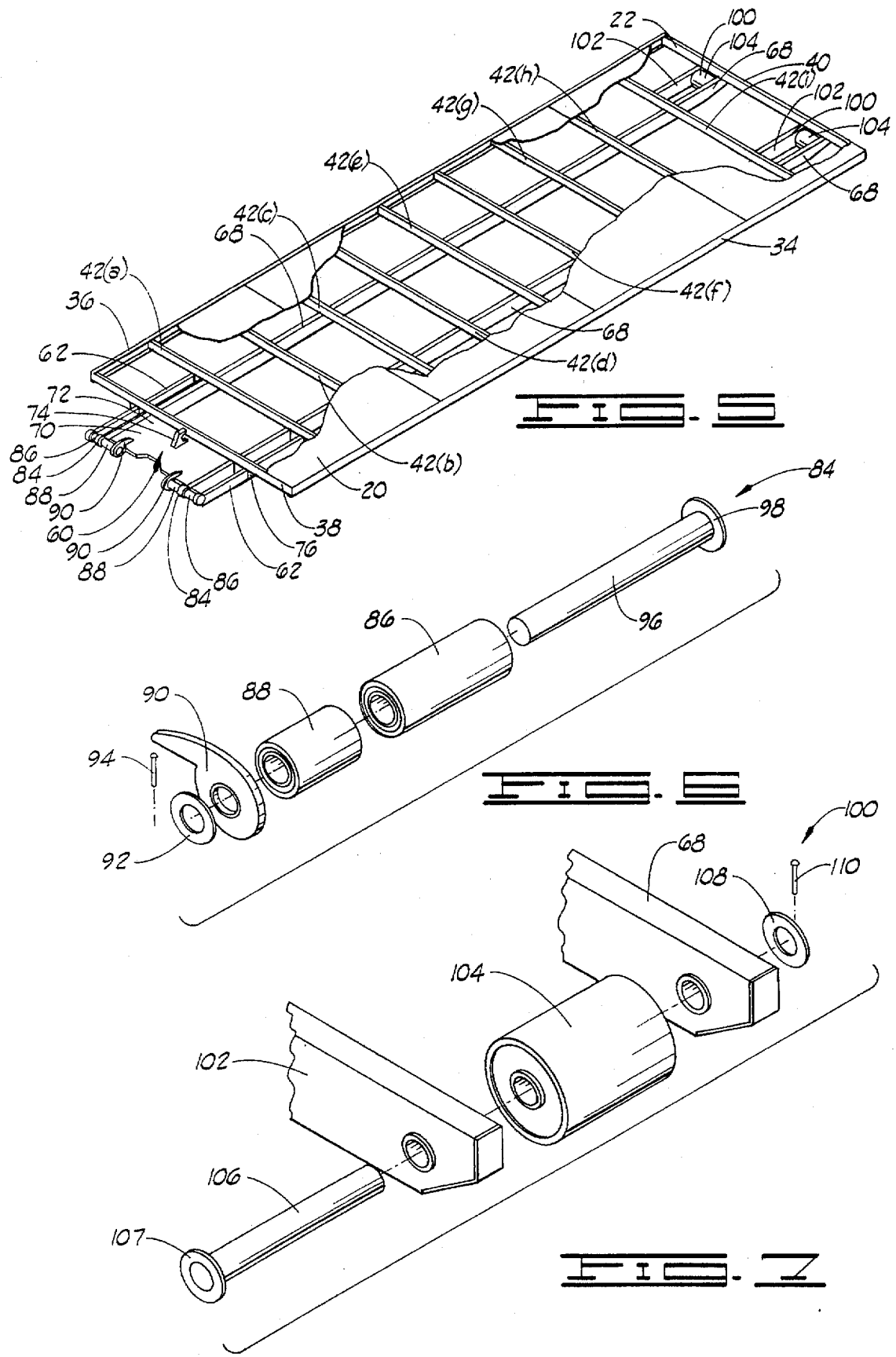

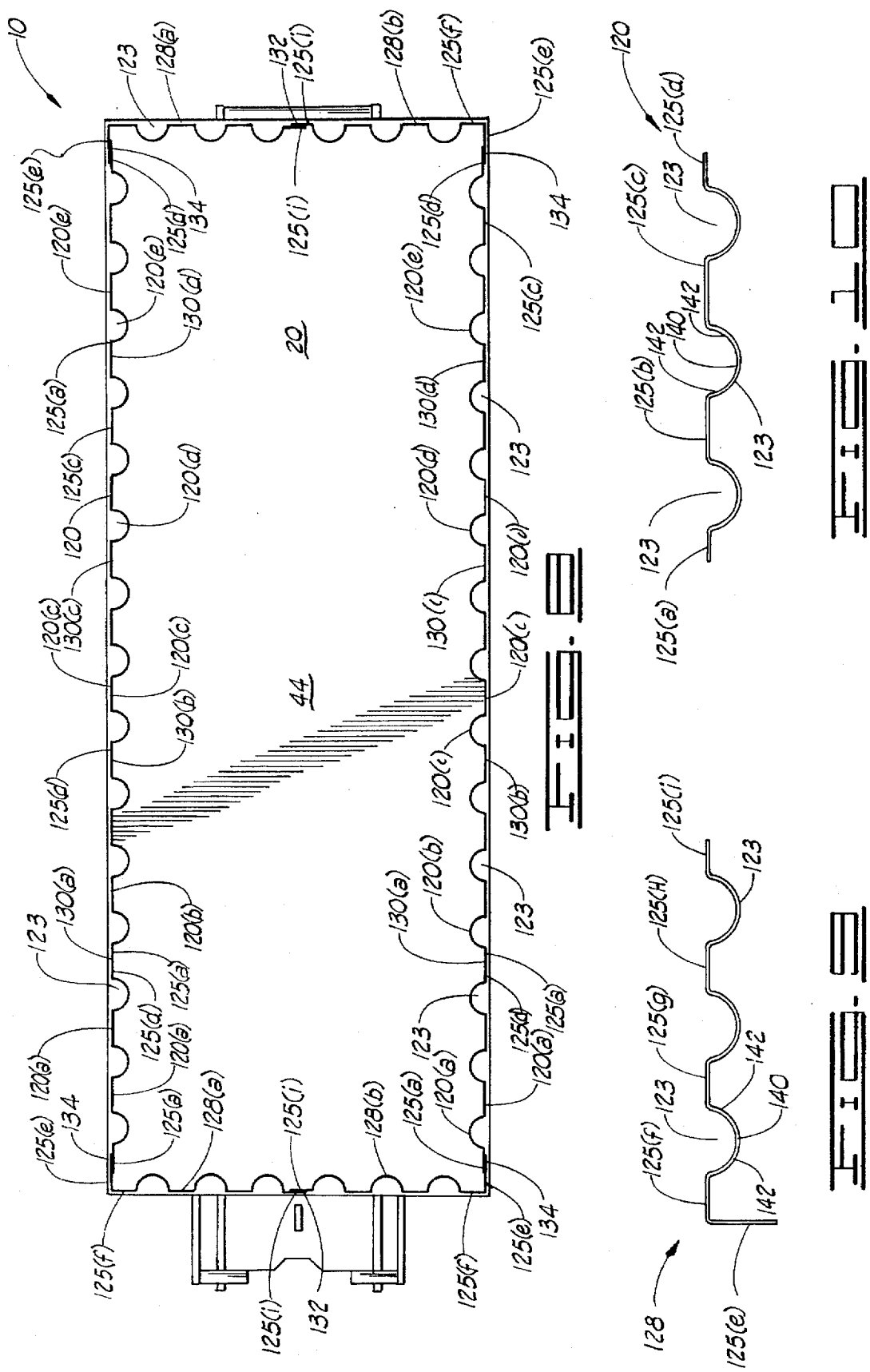

HIGH STRENGTH INDUSTRIAL STORAGE TANK

BACKGROUND OF THE INVENTION

1. Field of the Invention

This invention relates generally to industrial storage tanks for containing large volumes of material. In one aspect, the invention relates to high strength industrial storage tanks that include sidewalls that have been specially constructed or reinforced in some way. In another aspect, the invention relates to portable industrial storage tanks designed to be hauled by roll-off transport trucks.

2. Background of the Invention

Many types of industrial storage tanks for containing large volumes of material have been produced. Such tanks are formed in a variety of shapes and sizes depending upon the end use desired. The tanks can be stationary or portable.

Portable industrial storage tanks are used in many applications. For example, portable industrial storage tanks are commonly used to temporarily contain drilling fluids, fracturing fluids, and other liquids/fluids associated with oil and gas wells. Portable industrial storage tanks are also commonly used in connection with new construction sites (e.g., to contain waste) and in connection with various chemical process operations. Portable industrial storage tanks designed specifically to contain liquids and/or other fluids typically hold from ten thousand to twenty-one thousand gallons of fluid and are generally hauled or towed from location to location only when empty.

Stationary industrial storage tanks are commonly used in connection with industrial plants, hospitals and other permanent facilities. For example, stationary industrial storage tanks are frequently used to contain automotive, marine, and aircraft fuels and lubricants, water, waste and many other process liquids.

The strength required of an industrial storage tank varies depending on many factors including whether the tank is portable or stationary, the type of material to be stored and the capacity of the tank. The overall strength of an industrial storage tank is often enhanced by increasing the strength of the sidewalls of the tank. For example, in order for portable industrial storage tanks to contain large volumes (e.g., 10,000 gallons) of heavy materials, such as slurries having densities of 10 pounds per gallon or more, and yet be capable of over-the-road transport, the sidewalls of such tanks are typically specially constructed or reinforced in some way to prevent them from buckling or otherwise failing.

One way of enhancing the strength of the sidewalls of an industrial storage tank is to modify the structure of the sidewalls or various sections thereof such that the sidewalls or sections include a series of vertical corrugations or one-way channels, etc. The vertical corrugations or one-way channels add strength to the sidewalls by increasing the associated section modulus and tolerable bending moments. Unfortunately, the corrugations or channels are often formed with sharp creases and/or low radius bends (e.g., curvilinear portions having substantially constant radii of less than one inch). It is difficult to clean and maintain paint and other protective coatings in the creases and/or low radius bends which often results in corrosion of the sidewalls. Corrosion is particularly a problem with storage tanks designed for liquids and other fluids.

The strength of the sidewalls of an industrial storage tank can also be enhanced by interconnecting the sidewalls with internal tie rods. The rods are placed in tension when a liquid load is stored within the tank. Of course, the tie rods make it difficult or impossible to store solid materials in the tank. Another problem associated with this method of reinforcement is cleaning the tank. It is generally necessary to thoroughly clean a fluid storage tank after each use in order to prevent corrosion, contamination of fluids subsequently placed in the tank and so forth. The tie rods make the cleaning operation difficult often resulting in an inadequate cleaning job. Further, it is difficult to maintain a protective coating on the tie rods making the tie rods themselves susceptible to corrosion and failure. Additional problems are also associated with the use of internal tie rods.

There is a need for a rodless industrial storage tank that includes sidewalls that are strong enough to contain large volumes of heavy materials such as high density fluids yet smooth enough to sufficiently retain paint and other protective coatings and permit easy cleaning.

Many types of portable industrial storage tanks, e.g., solid waste containers, are provided with rollers and other structure which make them compatible with vehicles commonly known as "roll-off transport trucks". A roll-off transport truck contains a hydraulic tilting bed and cable-winch assembly, both generally operated from the truck cab. The structure allows corresponding "roll-off containers" to be easily loaded, transported and unloaded.

Unfortunately, the roll-off industrial storage tanks presently on the market are not suitable for containing certain liquids and other fluids. There is a need for a portable fluid storage tank, particularly a portable liquid storage tank, that is compatible with roll-off transport trucks.

SUMMARY OF THE INVENTION

In accordance with the present invention, an improved industrial storage tank that meets the needs described above is provided. In one aspect, the invention provides a rodless industrial storage tank that has sidewalls that do not include a large number of sharp creases and/or low radius bends yet are strong enough to contain large volumes of heavy materials such as high density fluids. The structure of the sidewalls makes it relatively easy to clean the tank and apply and maintain paint and other protective coatings on the surfaces thereof. In another aspect, the invention provides a portable industrial storage tank that is designed specifically for containing liquids and other fluids and is compatible with roll-off transport trucks.

Accordingly, the present invention provides an industrial storage tank comprising a pair of opposed sidewalls, each sidewall including a series of alternating vertically extending outer members and vertically extending grooves. Each groove extends toward the interior of the tank, includes a bottom and two sides and has a continuously curvilinear cross section. Each side of each groove is connected to one of the outer members. The tank further comprises a pair of opposed end walls including a front end wall and a rear end wall, each end wall interconnecting the sidewalls, and a floor connected to the sidewalls and the end walls.

In one embodiment, each of the outer members of the sidewalls is substantially flat. Each groove of the sidewalls includes an inner arcuate portion that is arched toward the interior of the tank and has a substantially constant radius of from about 3.0 inches to about 4.5 inches. Each side of each groove of the sidewalls includes an outer arcuate portion that is arched away from the interior of the tank and has a substantially constant radius of from about 0.375 inch to about 1.0 inch, wherein one end of the outer arcuate portion is attached to the inner arcuate portion and one end of the outer arcuate portion is attached to one of the outer members. In another embodiment, the structure of the end walls is the same as the structure of the sidewalls, e.g., each end wall includes a series of alternating vertically extending outer members and vertically extending grooves, each groove extending toward the interior of the tank, including a bottom and two sides and having a continuously curvilinear cross section.

The inventive industrial storage tank is useful in any application in which a high strength industrial storage tank is desired. The above sidewall structure can be used to enhance the strength of any type of industrial storage tank. The specific dimensions and features of other structure of the tank can be varied depending on the end use required. For example, in one embodiment, the inventive industrial storage tank includes a foundation connected to and underlying the floor and a top opposing the floor and connected to the sidewalls and the end walls. This embodiment of the tank is particularly useful for storing liquids and other fluids.

In yet another embodiment, the inventive industrial storage tank is a portable storage tank that is compatible with a roll-off transport truck. In this embodiment, the tank includes a foundation connected to and underlying the floor. A roll-off transport truck hook-up assembly is attached to the foundation and includes a pair of spaced skids attached to and underlying the foundation. The skids extend under the foundation in planes substantially parallel to vertical planes of the sidewalls and are spaced for engagement with the track assembly of a roll-off transport truck. This embodiment of the tank is compatible with a conventional roll-off transport truck even though it does not contain wheels or rollers on the bottom of the tank.

The alternating vertically extending outer members and vertically extending grooves of the sidewalls (and optionally the end walls) of the inventive tank greatly enhance the strength of the sidewalls. Due to the continuously curvilinear cross-section of the grooves, the sidewalls do not include sharp creases and the like. In the embodiment in which each of the grooves includes an inner arcuate portion and each side of the grooves includes an outer arcuate portion as described above, only two low radius bends are associated with each groove. Thus, the sidewalls (and optionally end walls) are easy to clean and contain significantly fewer areas in which paint and other protective coatings can easily crack and/or peel.

It is, therefore, an object of the present invention to provide an industrial storage tank that has sidewalls and/or end walls that are strong enough to contain heavy materials such as high density fluids and yet do not include a large number of sharp creases and/or low radius bends.

It is also an object of the present invention to provide an industrial storage tank that is particularly useful for storing liquids and other fluids and is compatible with roll-off transport trucks.

Additional objects, features and advantages of the present invention will be readily apparent to those skilled in the art upon a reading of the detailed description of preferred embodiments of the invention which follows when taken in conjunction with the accompanying drawings.

BRIEF DESCRIPTION OF THE DRAWINGS

FIG. 1 is a perspective view of a preferred embodiment of the inventive industrial storage tank.

FIG. 2 is a side plan view of the embodiment of the inventive tank shown by FIG. 1 illustrating the side of the tank not shown by FIG. 1.

FIG. 5 is a view similar to FIG. 4 but illustrating an alternative embodiment of the inventive tank wherein the tank includes front and rear rollers.

FIG. 6 is an exploded view illustrating a front roller assembly included in the embodiment of the tank shown by FIG. 5.

FIG. 7 is an exploded view illustrating a rear roller assembly included in the embodiment of the tank shown by FIG. 5.

FIG. 8 is a plan view of the inventive tank with the top removed illustrating the layout of the various sections forming the sidewalls and end walls of the tank.

FIG. 9 is an enlarged top view of one of the end wall sections illustrated by FIG. 8.

FIG. 10 is an enlarged top view of one of the sidewall sections illustrated by FIG. 8.

DETAILED DESCRIPTION OF PREFERRED EMBODIMENTS OF THE INVENTION

Figure 3:
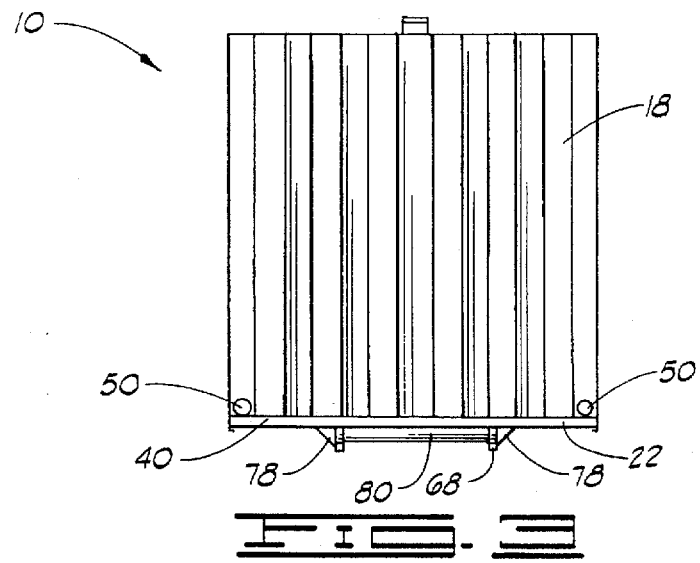
FIG. 3 is a rear view of the embodiment of the inventive tank shown by FIG. 1.

Referring now to FIGS. 1–4, a preferred embodiment of the inventive industrial storage tank is illustrated and generally designated by the numeral 10. In this embodiment, the tank is portable and includes structure making it particularly applicable for storing liquids, high density fluids and so forth. This embodiment of the tank also includes structure making it compatible with a roll-off transport truck.

The tank 10 includes a pair of opposed sidewalls 12 and 14 and a pair of opposed end walls including a front end wall 16 and a rear end wall 18. The sidewalls 12 and 14 extend substantially parallel to each other and are identical. The front end wall 16 and rear end wall 18 each interconnect the sidewall 12 and the sidewall 14. The end walls 16 and 18 also extend substantially parallel to each other.

A floor 20 is connected to the sidewalls 12 and 14 and the end walls 16 and 18. A foundation 22 is connected to and underlies the floor 20. A top 23 opposes the floor 20 and is connected to the sidewalls 12 and 14 and end walls 16 and 18.

As shown by FIG. 1, the top 23 is formed by four roof panels 26(a)–(d), each attached to the sidewalls 12 and 14. The front roof panel 26(a) and rear roof panel 26(d) are also attached to the front end wall 16 and rear end wall 18, respectively. A plurality of rafters 28 are attached to and underlie the top 23. Each rafter 28 extends from the sidewall 12 to the sidewall 14. The rafters 28 are equally spaced along the length of the top 23.

Figure 4:
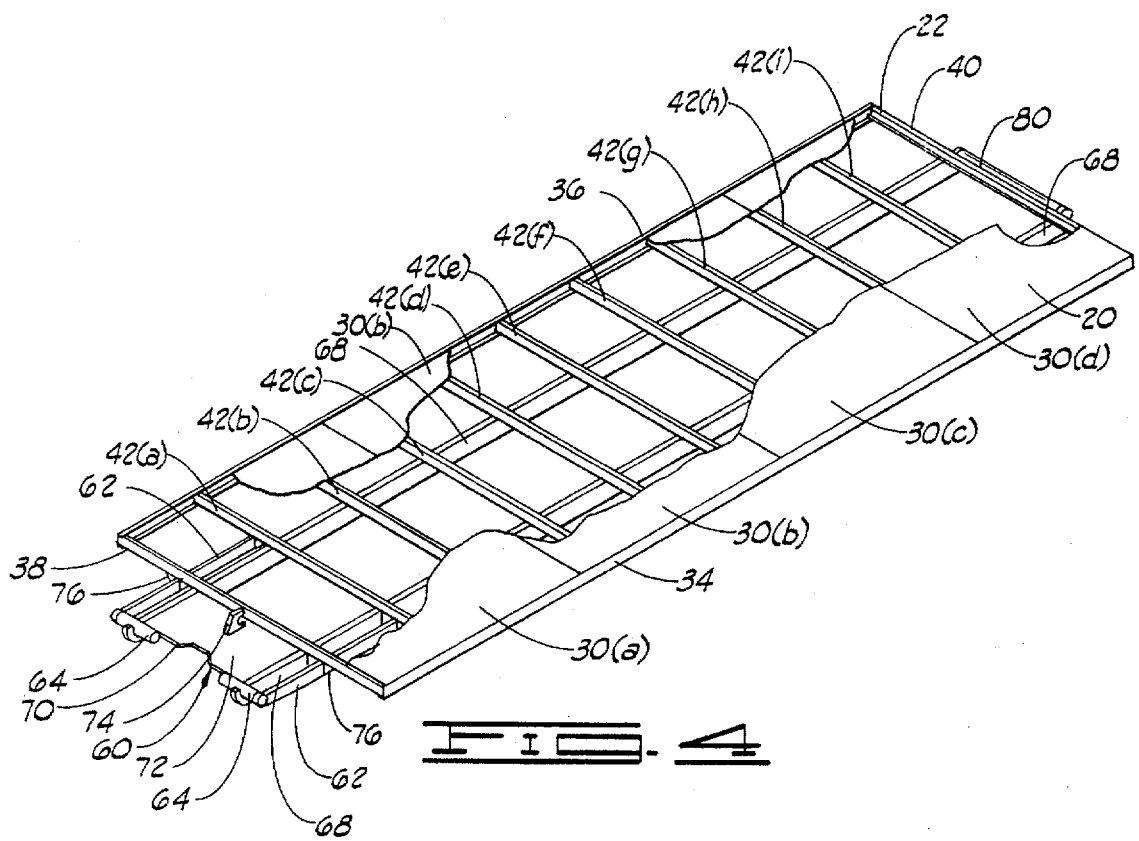
FIG. 4 is a sectional view illustrating the foundation, floor and roll-off transport truck hook-up assembly of the inventive tank.

As best shown by FIG. 4, the floor 20 consists of four floor panels 30(a)–(d), each panel being attached to the foundation 22. The foundation 22 includes a pair of opposed side members 34 and 36, and a pair of end members including a front end member 38 and a rear end member 40, each end member interconnecting the side members. A plurality of intermediate cross members 42(a)–(i) interconnect the side members 34 and 36 and are equally spaced along the length of the foundation 22.

The tank 10 has an overall rectangular shape and includes an interior 44 and exterior 46. This embodiment of the tank is designed specifically to hold liquids and other fluids. For example, assuming low pressure venting is established, the interior of the tank can be completely sealed off to the atmosphere. A six-inch fill nipple 48 extends through the top 23 into the interior 44 of the tank. A four-inch drain nipple 50 is located in each of the bottom corners of both the front end wall 16 and rear end wall 18. An eighteen-inch manway 52 extends through the front end wall 16 and provides access to the interior 44 of the tank allowing the interior of the tank to be easily cleaned, maintained (e.g., recoated with corrosion inhibitors) and so forth. The manway 52 is sealed by a bolt-on cover 53. A vent 54 also extends through the front end wall 16 into the interior 44 of the tank. Of course, inasmuch as the tank 10 does not contain internal tie rods and the like, it can be easily modified for storing solid material as well. For example, the top 23 and rafters 28 can be removed or modified such that they open and allow access to the tank.

As best shown by FIG. 4, a roll-off transport truck hook-up assembly 60 is attached to the foundation 22. The assembly 60 includes a pair of outer support members 62, a pair of front bumper members 64, a pair of horizontally spaced skids 68, and a cable hook-up assembly 70 including a plate 72 and cable hook-up member 74. The outer support members 62 each partially underlie the foundation 22 and extend from an intermediate cross member 42(a) to a front bumper member 64. The skids 68, which are identical, are attached to and underlie the foundation 22. The skids 68 extend under the foundation 22 in planes that are substantially parallel to vertical planes of the sidewalls 12 and 14 and are spaced for engagement with the track assembly of a roll-off transport truck (described further below). In the embodiment shown by FIG. 4, the skids 68 also support the tank 10 on the ground. Each skid 68 extends the length of the foundation 22 from beyond the rear end member 40 to a front bumper member 64. Each skid 68 is attached to the rear end member 40, intermediate cross members 42(a)–(i), front end member 38 and a front bumper member 64.

The cable hook-up assembly 70 is attached to the foundation 22. The plate 72 is positioned below and extends perpendicularly with respect to the front end wall 16. Each side of the plate 72 is attached to a skid 68. The front of the plate 72 is attached to each of the front bumper members 64. The rear of the plate 72 is attached to the front end member 38 of the foundation 22. The hook-up member 74 is attached to the plate 72 and extends upwardly from the top thereof.

A pair of front reinforcing braces 76 and a pair of rear reinforcing braces 78 further support attachment of the skids 68 to the foundation 22. A rear bumper member 80 interconnects the rear ends of the skids 68.

Referring now to FIGS. 5–7, an alternative embodiment of the roll-off transport truck hook-up assembly 60 is illustrated. In this embodiment, the assembly 60 includes a pair of spaced front rollers and a pair of spaced rear rollers. The rollers facilitate loading and unloading the tank and enhance the life of the skids 68.

In the embodiment shown by FIGS. 5–7, a front roller assembly 84 is substituted for each of the front bumper members 64 of the assembly 60. The front roller assemblies 84 are identical. Each front roller assembly 84 includes a front roller support member 86, a front roller 88, a front roller end support 90, a washer 92, a pin 94 and a shaft 96. The front roller support member 86 is attached to an outer support member 62, skid 68 and front roller 88. As best shown by FIG. 6, the shaft 96 has a head 98 and extends through the front roller support member 86, front roller 88, front roller end support 90 and washer 92 with the head abutting against the front roller support member. The pin 94 holds the shaft 96 in place. The front roller end support 90 rests on the plate 72. The front rollers 88 are positioned adjacent the cable hook-up assembly 70 and are spaced for engagement with the track assembly of a roll-off transport truck (described further below).

As best shown by FIG. 7, a pair of rear roller assemblies 100 is attached to the foundation 22. Each rear roller assembly 100 is identical and includes a rear roller support member 102, a rear roller 104, a shaft 106, a washer 108 and a pin 110. The rear roller support member 102 extends from the rear end member 40 to the intermediate cross member 42(i) of the foundation 22. The rear roller 104 is attached between the rear roller support member 102 and a skid 68 by the shaft 106. The shaft 106 has a head 107 and extends through the rear roller support member 102, rear roller 104, skid 68 and washer 108. The head 107 of the shaft 106 abuts against the support member 102. The shaft 106 is held in place by the pin 110. The rear rollers 104 support the rear end of the tank on the ground and, as further described below, facilitate loading and unloading of the tank on and off a roll-off transport truck.

The roll-off transport truck hook-up assembly 60 (both with and without the roller assemblies 84 and 100) allows the tank 10 to be easily transported by conventional roll-off transport trucks. Inasmuch as the tank 10 is very suitable for storing liquids and other fluids, it fills a gap in the roll-off industrial storage tank industry. For example, the inventive tank can be hauled by conventional roll-off transport trucks to new construction sites where it can be used for various purposes such as the storage of fire fighting water.

The assembly 60 can be easily modified to make the tank 10 compatible with other means of transport. For example, referring to the embodiment illustrated by FIG. 4, the plate 72 and hook-up member 74 forming the cable hook-up assembly 70 can be eliminated and another type of hitch assembly (e.g., a "tailboard load" assembly) can be substituted therefor. The skids 68 still function to support the tank 10 on the ground.

Referring now to FIGS. 8–12, the unique structure of the sidewalls 12 and 14 and end walls 16 and 18 of the tank 10 is illustrated in detail. As shown by FIG. 8, the sidewall 12 and sidewall 14 are each formed by five sidewall sections 120(a)–120(e). Each sidewall section 120 includes three vertically extending grooves 123 and four vertically extending outer members 125(a)–(d). The front end wall 16 and rear end wall 18 are each formed by two end wall sections 128(a)–(b). Each end wall section 128 includes three vertically extending grooves 123 and five vertically extending outer members 125(e)–(i). Each groove 123 is approximately 8½ inches wide at its widest point. The outer members 125(b) and 125(c) are also approximately 8½ inches wide. The outer members 125(a) and 125(d) are approximately 4¼ inches wide. The outer members 125(f)–(h) are approximately 6½ wide. The outer member 125(e) extends at a right angle with respect to the outer member 125(f) and is approximately 9 inches long. The outer member 125(i) is approximately 4 inches long.

The sidewall sections 120(a)–(e) are welded together by continuous vertical butt weld seams 130(a)–(d). For example, the outer members 125(d) of sidewall sections 120(a) are welded to the outer members 125(a) of sidewall sections 120(b) by continuous vertical butt weld seams 130(a). The outer members 125(i) of end wall sections 128(a) overlap the outer members 125(i) of end wall sections 128(b) forming vertical lap seams 132. The lap seams 132 are each welded together by two continuous vertical welds. The outer members 125(e) of the end wall sections 128 each overlap an outer member 125(a) or 125(d) of a sidewall section 120 forming vertical lap seams 134. The lap seams 134 are each welded together by two continuous vertical welds. The sidewall sections 120 and end wall sections 128 are each welded on both sides directly to the floor 20 (including floor panels 30) by continuous fillet weld seams (not shown) extending the length and width of the floor and are each welded on both sides directly to the top 23 (including roof panels 26) by continuous fillet weld seams (not shown) extending the length and width of the top. As shown by FIG. 1, the rafters 28 are spaced along the length of the top 23 such that a rafter is positioned adjacent the inside surface of every other outer member 125 of the sidewall sections 120 forming the sidewalls 12 and 14.

Figure 11:
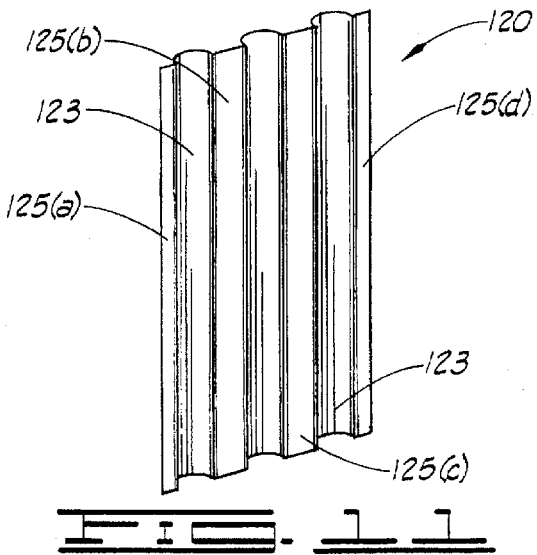
FIG. 11 is a perspective view of the sidewall section illustrated by FIG. 10.

The grooves 123 of the sidewall sections 120 and end wall sections 128 each extend toward the interior 44 of the tank 10, include a bottom 140 and two sides 142 and have a continuously curvilinear cross section. Each side 142 of each of the grooves 123 is connected to a corresponding outer member 125. Each of the outer members 125 is substantially flat. As shown by FIG. 11, the sidewall sections and end wall sections are each formed such that the grooves 123 and outer members 125 thereof each extend from the bottom of the section to the top thereof and are spaced along the length of the section.

Figure 12:
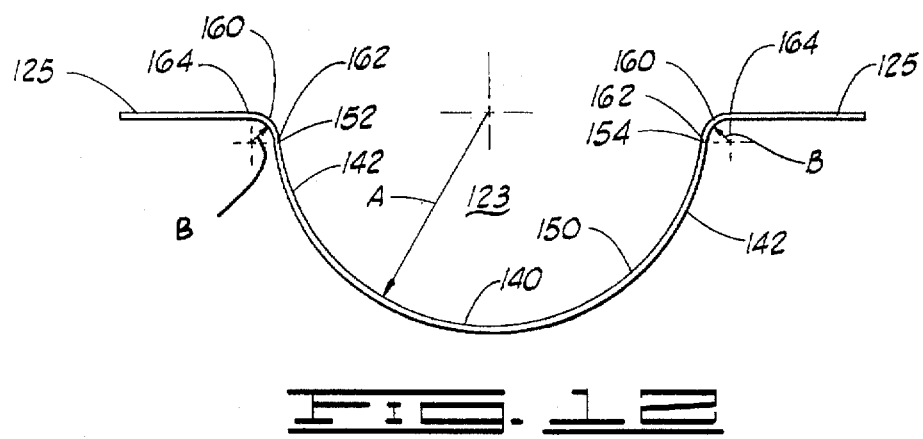
FIG. 12 is an enlarged top view of part of the sidewall section illustrated by FIG. 11.

Each of the grooves 123 includes an inner arcuate portion 150 arched toward the interior 44 of the tank 10. As best shown by FIG. 12, each inner arcuate portion 150 extends from an end 152 to an end 154, and has a substantially constant radius of from about 3.0 inches to about 4.5 inches. Preferably, each inner arcuate portion 150 of the grooves 123 has a substantially constant radius of from about 4.0 inches to about 4.5 inches, most preferably about 4.25 inches. The substantially constant radius of the inner arcuate portion 150 of a groove 123 is represented by imaginary line A in FIG. 12.

Each side 142 of the grooves 123 includes an outer arcuate portion 160 arched away from the interior 44 of the tank 10. Each outer arcuate portion 160 extends from an end 162 to an end 164 and has a substantially constant radius of from about 0.375 inch to about 1.0 inch. Preferably, each outer arcuate portion 160 has a substantially constant radius of from about 0.375 inch to about 0.625 inch, most preferably about 0.5 inch. The substantially constant radii of the outer arcuate portions 160 of the sides 142 of the grooves 123 are represented by imaginary lines B in FIG. 12. The end 162 of each outer arcuate portion 160 is attached to an end 152 or 154 of the inner arcuate portion 150 whereas the end of 164 of each outer arcuate portion is attached to an outer member 125.

Thus, due to the continuously curvilinear cross section of the grooves 123, the sidewalls 12 and 14 and end walls 16 and 18 do not include sharp creases and the like. The relatively large radius of the inner arcuate portion 150 of each groove makes the sidewalls and end walls easier to clean and improves the ability of the sidewalls and end walls to accept and retain paint and other protective coatings. The outer arcuate portion 160 of each side 142 of the grooves 123 eliminates sharp creases at the intersection of the grooves and outer members 125. This also makes the sidewalls and end walls easier to clean and improves the ability of the sidewalls to accept and retain paint and other protective coatings. Of course, the extent of these advantages increases as the radii of the inner arcuate portions 150 and outer arcuate portions 160 increase. The fact that the grooves 123 extend toward the interior 44 of the tank further enhances the strength of the sidewalls and end walls.

Figure 13:
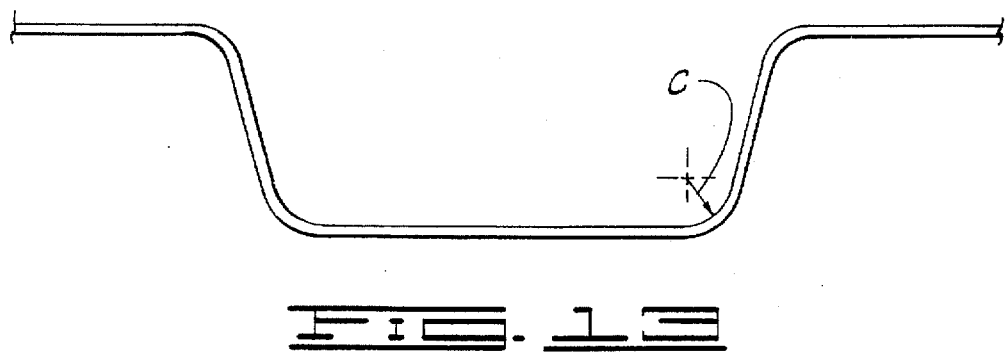
FIG. 13 is a view similar to FIG. 10 but illustrating the structure of part of the section of a sidewall of a prior art industrial storage tank.
Figure 14:
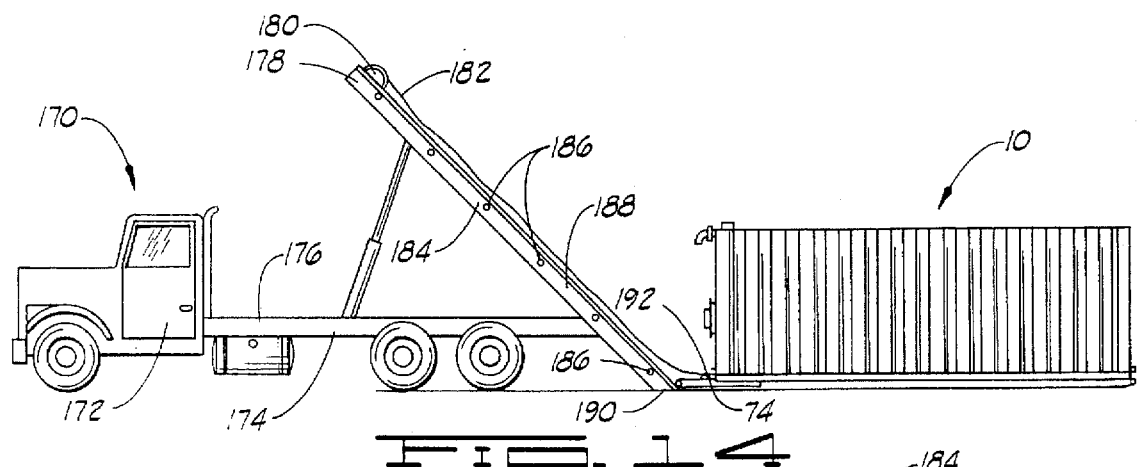
FIGS. 14–17 illustrate the loading, hauling and unloading of the inventive storage tank by a roll-off transport truck.

The cross section of a vertically extending groove of a sidewall section of a prior art industrial storage tank is illustrated by FIG. 13. As shown, this groove contains four relatively low radius bends as opposed to the two relatively low radius bends associated with the grooves of the sidewalls and end walls of the inventive tank. For example, the radius of one of the arcuate portions of the groove shown by FIG. 13 is about one inch, as represented by imaginary line C of FIG. 13.

The sidewalls 12 and 14, end walls 16 and 18, floor 20 (including floor panels 30) and top 23 (including roof panels 26) are all preferably made of carbon steel, preferably of ¼ inch, 3/16 inch or 10 gauge thickness. The foundation 22 and rafters 28 of the tank 10 are also preferably made of steel. The sidewall sections 120 and end wall sections 128 are preferably formed by machine pressing flat sheets of steel. A brake press is used to cause a pair of dyes to move toward each other, and to thus bend and shape a metal sheet located between the dies. Three grooves 123 are formed in each sheet. For example, the inner arcuate portion 150 of each groove 123 is formed by bending the sheet on the desired substantially constant radius, e.g., about 4.25 inches.

FIGS. 14-17 illustrate how the inventive tank 10 is loaded on, transported by and unloaded from a roll-off transport truck. A roll-off transport truck 170 includes a cab 172, a frame 174 and a bed 176. The bed 176 includes a tilting track assembly 178 which includes a winch 180, cable 182 and a pair of horizontally spaced rail units 184. Each rail unit 184 is substantially identical and includes a plurality of rollers 186 transversely extending from an outer side 188 thereof. In order to load the inventive tank 10 onto the bed 176 of the truck 170, the track assembly 178 is tilted such that a rear end 190 thereof engages or is close to the ground. An end 192 of the cable 182 is then connected to the cable hook-up member 74 of the cable hook-up assembly 70 of the tank 10 and the winch 180 is operated to wind up the cable and pull the tank onto the track assembly 178.

Figure 15:
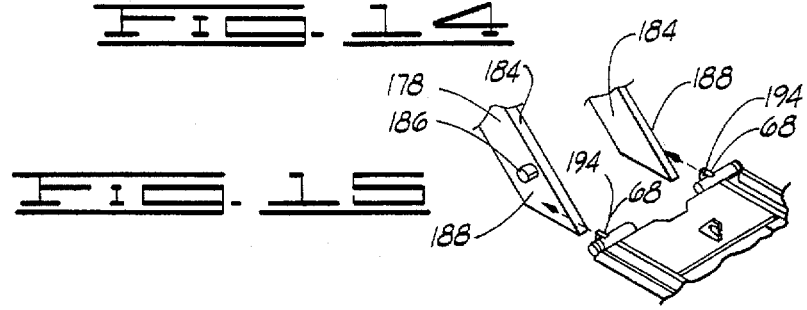
Figure 16:
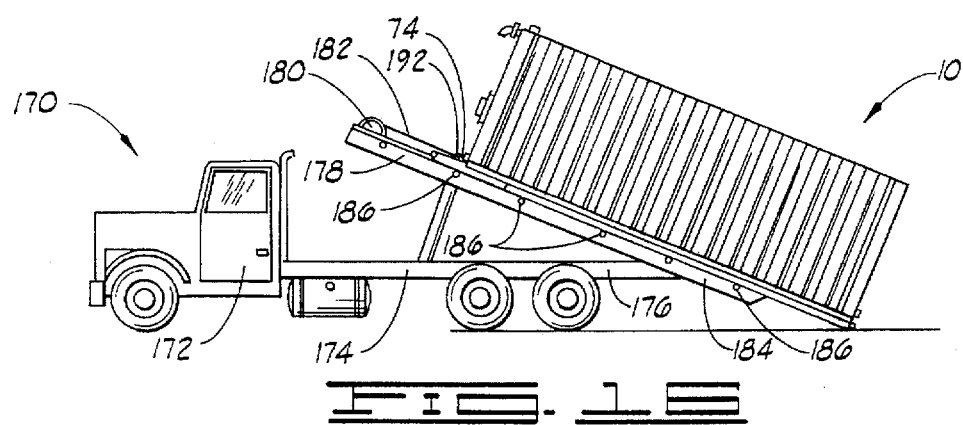
Figure 17:
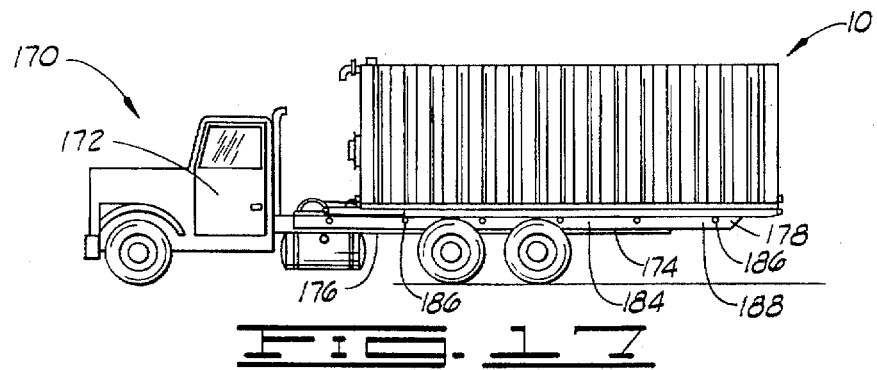

As best shown by FIG. 15, each skid 68 of the tank 10 is positioned opposite an outer side 188 of a rail unit 184 such that the skid engages the rollers 186 of the rail unit as the tank is pulled onto the bed. Thus, the rollers 186 support the weight of the tank 10. The outer side 188 of each rail unit 184 prevents the tank 10 from laterally moving on the track assembly 178 by abutting against an inside surface 194 of the corresponding skid 68 of the tank.

Once the tank 10 is sufficiently pulled up onto the track assembly 178, the track assembly is lowered and the tank is ready to be hauled. In unloading the tank 10 from the truck 170, the track assembly 178 is tilted and the winch 180 is operated to slightly unwind the cable 182 such that the rear bumper 80 of the tank is close to or engages the ground. The winch 180 is then further operated to unwind the cable 182 and allow that tank 10 to slide off the track assembly 178. The truck 170 can be driven forward as the cable 182 is unwound to facilitate the unloading process.

Inclusion of the front roller assemblies 84 and rear roller assemblies 100 on the tank 10 facilitates the loading and unloading process. In loading the tank 10 onto the truck 170, the front rollers 88 initially engage the rail units 184 which makes it easier to position the skids 68 of the tank on the first set of rollers 186 of the rail units. The rear rollers 100 engage the ground during the loading and unloading process which extends the life of the skids 68 and facilitates the loading and unloading process. For example, the rear rollers 100 make it unnecessary to drive the truck 170 forward when unloading the tank.

Thus, the present invention is well adapted to carry out the objects and attain the ends and advantages mentioned as well as those which are inherent therein. While numerous changes to the industrial storage tank of this invention may be made by those skilled in the art, such changes are encompassed within the spirit of this invention as defined by the appended claims.

What is claimed is:

1. A portable industrial storage tank comprising:

a pair of opposed sidewalls;

a pair of opposed end walls including a front end wall and a rear end wall each interconnecting said sidewalls, said sidewalls and said end walls each including a series of alternating vertically extending outer members and vertically extending grooves, each groove extending toward the interior of said tank and including a bottom and two sides, each groove further including an inner arcuate portion arched toward the interior of said tank and having a substantially constant radius of from about 3.0 to about 4.5 inches, each side of each of said grooves being connected to one of said outer members;

a floor connected to said sidewalls and said end walls;

a foundation connected to and underlying said floor;

a top opposing said floor and connected to said sidewalls and said end walls; and a roll-off transport truck hook-up assembly, said roll-off transport truck hook-up assembly including:
   a cable hook-up assembly attached to said foundation; and
   a pair of spaced skids attached to and underlying said foundation, said skids extending under said foundation in planes substantially parallel to vertical planes of said sidewalls and being spaced for engagement with the track assembly of a roll-off transport truck.

2. The portable industrial storage tank of claim 1 further comprising:

a pair of spaced rear rollers for supporting said tank on the ground, each of said rear rollers being attached to said foundation.

3. The portable industrial storage tank of claim 2 further comprising:

a pair of spaced front rollers attached to said foundation and positioned adjacent said cable hook-up assembly, said front rollers being spaced for engagement with the track assembly of a roll-off transport truck.

4. A roll-off portable industrial liquid storage tank comprising:

a pair of opposed sidewalls;

a pair of opposed end walls including a front end wall and a rear end wall each interconnecting said sidewalls;

a floor connected to said sidewalls and said end walls;

a foundation connected to and underlying said floor;

a top opposing said floor and connected to said sidewalls and said end walls; and a roll-off transport truck hook-up assembly including:
   a cable hook-up assembly attached to said foundation and including a plate positioned below said front end wall; and
   a pair of spaced skids attached to and underlying said foundation, said skids extending under the length of said foundation in planes substantially parallel to vertical planes of said sidewalls and being spaced for engagement with the outside surfaces of the rail units of a track assembly of a roll-off transport truck.

5. The roll-off portable industrial liquid storage tank of claim 4 further comprising:

a pair of spaced rear rollers for supporting said tank on the ground, each of said rear rollers being attached to said foundation.

6. The roll-off portable industrial liquid storage tank of claim 5 further comprising:

a pair of spaced front rollers attached to said roll-off transport truck hook-up assembly, said front rollers being spaced for engagement with the track assembly of a roll-off transport truck.

* * * * *